Feb. 13, 1962 G. MOUNTJOY ET AL 3,021,383

COIN OPERATED TELEVISION DISTRIBUTION SYSTEM

Filed Oct. 7, 1958 3 Sheets-Sheet 1

INVENTORS
JOHN D. REID
GARRARD MOUNTJOY
BY Darby & Darby
ATTORNEYS

Feb. 13, 1962 G. MOUNTJOY ETAL 3,021,383

COIN OPERATED TELEVISION DISTRIBUTION SYSTEM

Filed Oct. 7, 1958 3 Sheets-Sheet 2

INVENTORS
JOHN D. REID
GARRARD MOUNTJOY
BY Darby & Darby
ATTORNEYS

COIN OPERATED TELEVISION DISTRIBUTION SYSTEM

Filed Oct. 7, 1958 3 Sheets-Sheet 3

INVENTORS
JOHN D. REID
GARRARD MOUNTJOY
BY Darby & Darby
ATTORNEYS

United States Patent Office 3,021,383
Patented Feb. 13, 1962

3,021,383

COIN OPERATED TELEVISION DISTRIBUTION SYSTEM

Garrard Mountjoy and John Drysdale Reid, Little Rock, Ark., assignors to AR & T Electronics, Inc., North Little Rock, Ark., a corporation of Arkansas Filed Oct. 7, 1958, Ser. No. 765,901
13 Claims. (Cl. 178—5.1)

The present invention relates to a control system for controlling the distribution of television programs to subscribers in a closed circuit television distribution system. The invention relates more particularly to such a control system which is adapted to collect the coins prior to the viewing of a television program and which may be powered from the central station without the necessity for connection to the subscriber's household power supply. The times at which coins are required to view television programs and the number of coins required is controlled remotely from a central distribution station.

This application is a continuation-in-part of application Serial No. 641,643 in the name of Garrard Mountjoy and John Drysdale Reid for "Remote Control System For Television Program Distribution" filed February 21, 1957.

Much effort has been expended in developing and promoting a system whereby television programs may be broadcast in such a manner that only the set owners who pay a predetermined fee will be able to watch and enjoy the program. One approach of this problem has been to broadcast an electronically scrambled television program at the ordinary television frequencies and to provide set owners paying a predetermined fee with means to unscramble the transmitted signal. It has been proposed to provide an unscrambling signal over existing telephone wires, and it has also been proposed to provide an electrical device to be attached to the television set which is capable of unscrambling the transmitted signal and which records which programs are viewed so that the viewer may later be charged accordingly.

These previously proposed methods require that a "scrambled" television signal be broadcast over a normal television channel and hence the approval of the Federal Communications Commission is required to institute such a system. Considerable opposition exists to the use of public television channels for a limited audience rather than for the public at large, and at the present date approval of such a system has not been received. In the event that such a system is approved it will nevertheless be subjected to strict regulation by a government agency.

The present invention is adapted for use in a television system wherein the television programs are supplied to individual subscribers by a closed circuit system utilizing coaxial cable transmission lines, for example. Since such a system does not utilize radio broadcast techniques and hence does not require the assignment of a portion of the radio frequency spectrum, these systems are not regulated by the F.C.C.

Many such closed circuit television systems are presently in operation in localities where television reception is impossible or unreliable without the use of very tall antennas which are prohibitive in cost to the individual television set owner. In such localities television programs are received from a tall community television antenna or otherwise and one or more television channels are amplified and distributed to subscribers by means of very high frequency transmission lines such as coaxial cable.

In addition to the situation where ordinary television reception is poor, the closed circuit community television system is also adaptable to apartment houses and other situations where the use of individual antennas by each set owner is impractical. Closed circuit community television systems also have advantages in quality of signal and other factors which make such systems practical apart from the particular situations described above.

Since the present invention is designed to be used with closed circuit television distribution, it also becomes feasible to provide a system which is remotely controlled from the central station. As means must be provided to distribute the television programs, there is very little additional difficulty in distributing control signals for the purpose of setting the amounts to be charged for programs or otherwise controlling the distribution of the programs at the individual receivers.

The present invention also overcomes a serious objection to many previously proposed "pay as you go" television systems in that programs are paid for in advance by the deposit of coins. Payment in advance obviously eliminates considerable difficulty which may be encountered when it is necessary to charge the customer for programs viewed and collect the fees at some later date.

Another difficulty with previously proposed "pay as you go" television systems has been the likelihood that schemes would be devised to avoid payment and that operators of such systems would constantly be faced with a problem of operations designed to produce unscrambling devices which would allow the set owner to view a paid program without paying the required fee.

Since the system according to the present invention includes the use of a closed circuit television system, the system operator has access to the distribution equipment and may prevent tampering with the equipment or may cut off service to subscribers attempting to avoid payment by tampering with the equipment.

It is accordingly an object of the present invention to provide a remotely controlled coin operated control box for a closed circuit television distribution system.

It is another object of the present invention to provide a coin operated television distribution system in which the number of coins required to view a given program may be controlled by the central distribution station.

It is still another object of the present invention to provide a coin operated television distribution system in which the requirement for externally supplied power is small and wherein the power may be readily supplied for each subscriber station from a central distribution station.

It is still another object of the present invention to provide a remotely controlled television distribution system in which a signal supplied by a central distribution station provides power for the subscriber's stations and also by certain predetermined characteristics controls the number of coins required to view a given television program.

It is still another object of the present invention to provide a novel coin detection mechanism wherein the presence of coins deposited in a subscriber's station control box is detected by reason of the detuning of a resonant circuit part of which comprises a coil placed in proximity to a coin position.

It is a further object of the present invention to provide a coin operated control box for television distribution which is of simple and inexpensive construction and which is difficult or impossible for the subscriber to circumvent without detection.

Other objects and advantages of the present invention will be apparent from a consideration of the following description together with the appended drawings, in which.

As previously explained the control box is designed for operation with a closed circuit television distribution system where the television signal is provided to the set by a very high frequency transmission line leading from the central station to the individual subscriber's house.

In order to make the coin operated distribution system operative, it is necessary that the signal transmitted to the subscriber over the transmission line be such that it is not adapted to be used directly by the subscriber's television set. In other words, the signal provided is such that some operation such as frequency conversion, unscrambling or the like must be performed on the signal before it is fed to the subscriber's television set. With this condition imposed, it may easily be arranged that the coin operated control box disables a frequency converter or other conversion device in the receiver upon reception of a signal from a central station. At such time as the subscriber deposits the necessary number of coins to reactivate the converter unit, the television signal may be translated into a picture and sound by the normal operation of the customer's television set.

As an alternative to the converter approach explained above, the distribution control system may operate by the use of a filter or the like which blocks an otherwise usable television signal transmitted over the television transmission lines.

It is obvious that the blocking or filtering approach is subject to some disadvantages in that it would be much easier for a subscriber to intercept the acceptable signal from the distribution system and convey it to an ordinary television set and thus avoid payment of a fee. In addition, the second alternative method is thought to be less desirable by reason of other technical considerations.

Figure 1:
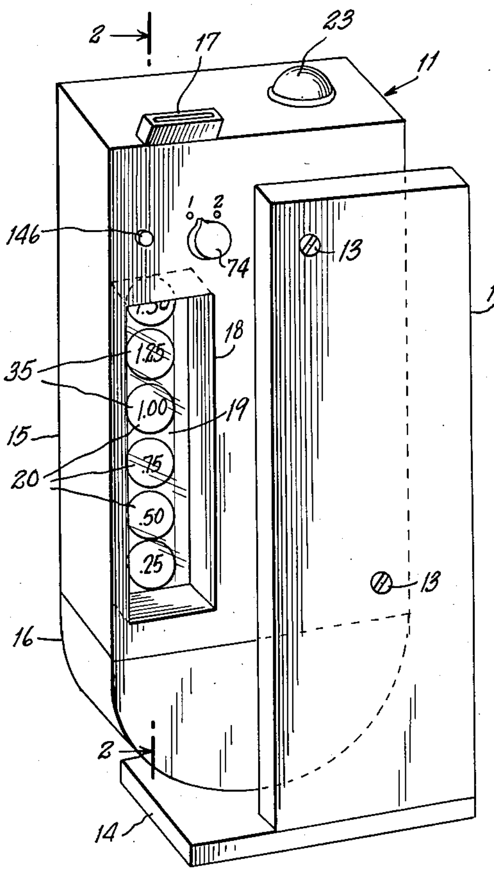
FIG. 1 is a front perspective view of a control box according to the present invention.

Referring now to FIG. 1, a coin operated control box for television distribution is shown at 11. An upright support 12 is provided for the box 11 which is connected to the support 12 by means of screws or bolts 13. A base 14 is provided which is attached to the upright support 12 in any suitable manner. The control box 11 comprises two parts, a control unit 15 and the coin collection receptacle 16. A coin slot 17 is provided at the top of the box for the insertion of coins.

A recess 18 in front of the box is provided containing a window 19 which may be of glass, transparent plastic, or other suitable material. A coin chute 21 leads from the slot 17 at the top of the box so that coins 35 deposited in the slot and retained by the control unit 15 are visible in the window 19 in the front of the control box 11.

The coin chute 21 is of a width such that it will accommodate only one coin and hence successive coins placed into the slot 17 stack one on top of the other as shown in FIG. 1. By way of example, the coin operated control box shown in FIG. 1 is adapted to accept quarters although it should be understood that the box could be designed to accept coins of a different denomination or to accept tokens or the like. Numerals 20 may be painted or otherwise imprinted on the window 19 to indicate the total sum of money represented by the coins 35 stacked in the coin chute 21.

An indicator light cover 23 is provided at the top of the control box. The function of the indicator light with cover 23 will be described below in connection with the operation of the electrical circuit of the control box.

Figure 2:
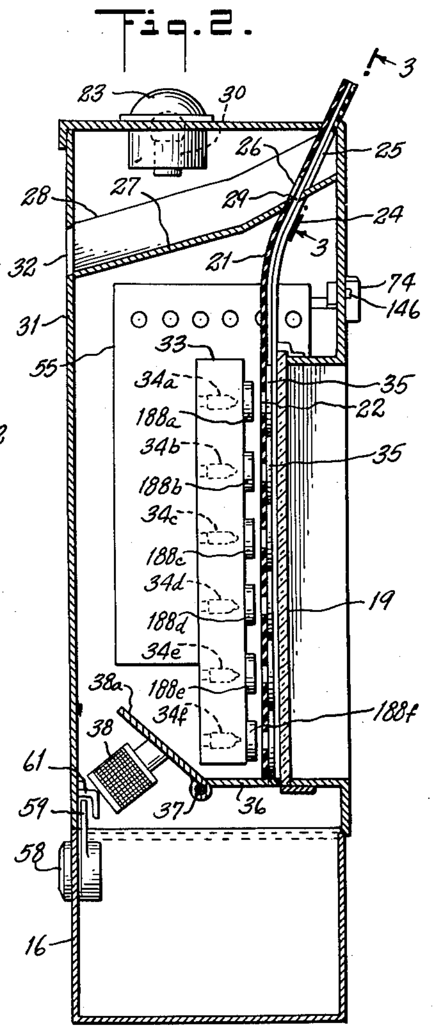
FIG. 2 is a vertical sectional view of the control box of FIG. 1 taken along the line 2—2 in FIG. 1.
Figure 3:
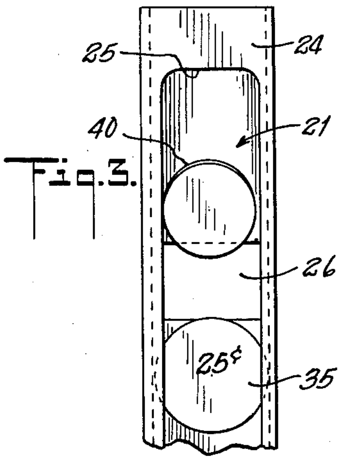
FIG. 3 is a sectional view of the coin chute of the control box taken along the line 3—3 of FIG. 2.

From FIG. 2 and also from FIG. 3 it will be seen that the front side 24 of the coin chute 21 has a cut-away portion 25 so that the width of the cut-away portion 25 is slightly less than the diameter of a quarter, shown for example at 35 in FIG. 3.

The cut-away portion 25 is wider than the diameter of the next smaller coin, such as a nickel. Thus a quarter inserted into the coin slot 17 is guided by the coin chute 21 downward past the window 19 until it reaches the end of the coin chute 21. A smaller coin such as a nickel or a dime, however, will fall out of the cut-away portion 25 in the coin chute 21.

The top of the coin chute 21 is bent forward at an angle as shown in FIG. 2 thus assuring that a smaller coin such as a nickel will fall out of the coin chute by the force of gravity and will not be guided by the coin chute 21 as are the quarters 35.

In order that the small rejected coins may be guided out of the coin chute 21, an aperture 26 is provided in the back of the coin chute and a reject chute 27 leads from the front of the control box to the rear of the control box and thus captures small rejected coins dropping out of the coin chute 21. The reject chute 27 is provided with side walls 28 for guiding the rejected coins and is also provided with a slot 29 where the accepted coins such as quarters pass through the reject chute and into the control box.

The reject coin chute 27 leads to the rear wall 31 of the control box 11. Rear wall 31 is provided with a coin reject opening 32 through which the small rejected coins pass out of the control box. This particular arrangement for the rejection of small coins, while of considerable advantage because of its simplicity and effectiveness, is exemplary only and any equivalent device for the rejection of coins smaller than that for which the machine is designed could equally well be used. The coin chute in the device of FIG. 1 is designed so that coins larger than a quarter will not fit into the slot.

The method provided above for preventing the insertion of coins other than a quarter into the operating portion of the control box is preferred for its simplicity and for its inexpensive construction. It should be noted that elaborate schemes for the rejection of slugs or counterfeit coins are not necessary due to the fact that the continued use of slugs by a subscriber may be prevented simply by terminating his service. In fact there is no absolute necessity for any type of coin separation device whatsoever, but it is thought that the temptation to use the wrong coins is better eliminated beforehand so that difficulty with subscribers is eliminated.

A particularly desirable feature of the present control box is provided by indicating lights in the box for indicating whether a free program or a pay program is being broadcast and also for indicating the amount of money required to view a pay program. A free program indicator lamp 30 for indicating the broadcast of a free program is provided at the top of the control box 11. The light bulb 30 is visible through the transparent light cover 23.

An indicator light bracket 33 is provided behind the window 19. Six indicator lights **34*a*, 34*b*, 34*c*, 34*d*, 34*e*, and 34*f* are supported by the indicator light bracket 33. Each of the indicator lights 34 is placed behind a respective coin position in the coin chute 21. In each of these coin positions a small hole 22 of diameter somewhat less than a quarter is provided in the rear of the coin chute 21. Therefore, in the absence of a quarter at the coin position of a particular indicator light, that particular indicator light will be visible through the hole 22 in the coin chute 21**.

The purpose of the indicator lights 34 is to indicate the sum of money (that is, the number of coins) required to view a particular paid program. The manner in which the lights are controlled will be explained at a later point in connection with the explanation of the electrical circuit of the control box.

The coin receptacle 16 may be held in position in any suitable manner but is preferably arranged to be slidably placed in position from the rear of the coin box 11. Thus the coin receptacle may be slid forward into a position enclosing the bottom of the control unit 15. A lock 58 is provided for the coin receptacle 16; the lug 59 on the lock 58 engages a slot in the bottom of the control unit 15. By inserting a key in the lock 58, the lug 59 may be rotated downward thereby releasing the coin receptacle so that it may be slid rearwardly from the control 15 and removed for the collection of coins. If desired the coin receptacle 16 may be a closed container having only a small slot of the entrance of coins so that the personnel making the collection of coins do not have ready access to the coins thereby reducing the possibility of pilferage.

The lug 59 on the lock 58 also engages a bracket 61 at the bottom of the rear panel 31 of the control unit 15. Thus the rear panel 31 is locked into position to prevent tampering with the control unit mechanism but may be removed for the necessary servicing by unlocking the lock 58.

A coin gate 36 is provided to close the bottom of the coin chute 21. The coin gate is pivotally mounted on a shaft 37. An electro-magnet 38 controls the coin gate 36. Actuation of the magnet 38 attracts the armature **38*a* of the gate 36 to the position shown in FIG. 2 thus retaining the gate closed against the weight of the coins 35 in the coin chute 21**.

When the electro-magnet 36 is deenergized the gate 36 is released and will be opened by the weight of one or more coins to release them to fall into the receptacle 16. In the absence of coins in the coin chute 21, the gate will remain in the closed position of FIG. 2 due to the weight of the armature **38*a*** acting as a counterbalance.

If desired a spring may be provided to urge the armature **38*a* away from the electro-magnet 38 so that it is unnecessary to rely upon the weight of the coins to open the gate 36**.

Figure 5:
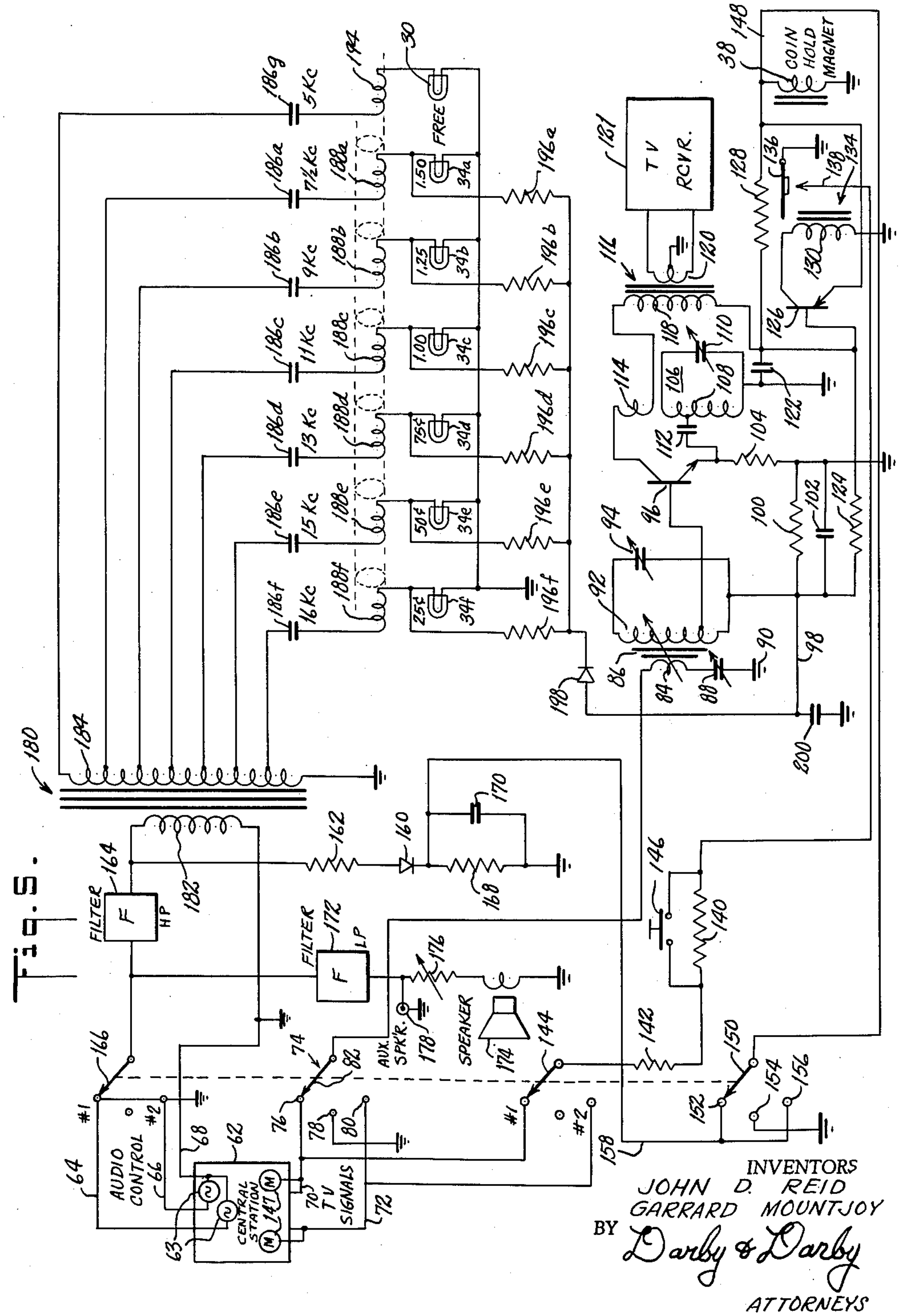
FIG. 5 is a schematic circuit diagram of the electrical circuit of a control box and control system.

A schematic diagram of the electrical components of the system is illustrated in FIG. 5. The transistors and relays and their associated components may be mounted in a housing 55 within the coin box 11 as illustrated in FIG. 2. A central distribution station for the television distribution system is shown at 62 in FIG. 5. It will be understood that the central station 62 will have facilities for transmitting one or more channels of television signals. The central station 62 will also have facilities for distributing an audio frequency control signal which serves to control the distribution of the television signals and also serves to power the subscriber's station equipment.

The system illustrated in FIG. 5 provides two television channels. However it is obvious that a greater or lesser number of channels could be provided in a similar fashion.

Electrical leads 64 and 66 are provided for control signals for the respective channels and a common return lead 68 is also provided which serves both channel 1 and channel 2.

Transmission lines 70 and 72 are provided for the respective television channels. The transmission lines 70 and 72 may consist of coaxial cable or any other suitable medium for the transmission of television signals. The source of the television signals for the transmission line 70 or 72 may be a camera broadcasting a live event such as a sports event or a television camera and motion picture arrangement for broadcasting programs recorded on moving picture film or any other source of television signal.

One of the two television programs available from transmission lines 70 and 72 may be selected by means of the channel selector switch 74 which has terminals 76, 78 and 80 and a movable contact arm 82. Terminals 76 and 80 are connected respectively to transmission lines 70 and 72. The center terminal 78 associated with the movable contact arm 82 is not utilized.

The television signals supplied by means of transmission lines 70 and 72 are preferably supplied at a carrier frequency which is outside of the normal television frequency bands. Accordingly commercially available television receivers will not be able to directly transform the television signals supplied through transmission lines 70 and 72 into a television image and associated sound signal.

As an example the television signal supplied from the central station might be supplied at a carrier frequency of 10 megacycles. Preferably the television signals supplied through transmission lines 70 and 72 are supplied at the same carrier frequency. Selection between the two channels carried respectively by transmission lines 70 and 72 is therefore made by physically connecting the subscriber's receiver to one or the other of the transmission lines.

The fact that commercially available television receivers are not adapted to directly receive the signals supplied by the central station allows the utilization of the broadcast signal to be controlled in a simple and effective manner. A frequency converter is supplied at the subscriber's station and the power for the frequency converter is supplied from the central station. Since the frequency converter utilizes transistor techniques the power required at each subscriber's station is not inordinately great. The power supply for the operation of the frequency converter is of an audio frequency which may be selectively changed by the central station. The frequency of power supply to the frequency converter is effective through a control circuit later to be described to determine the quantity of coins which must be deposited to render the frequency converter operative.

The television signal from one or the other of the transmission lines 70 and 72 is supplied through channel selector switch 74 to the primary 84 of the transformer 86 which represents the input to the frequency converter section of the control box. The transformer 86 may be double-tuned and over-coupled to provide the necessary 6 megacycle bandwidth for the television signals. A tuning capacitor 88 is connected in series with the primary 84 of the transformer 86. A ground return for the television signal supplied to the primary 84 is provided at 90.

A tunable condenser 94 is connected in parallel with the secondary 92 of the transformer 86 and an output is taken from a tap on the secondary 92 and supplied to the base of a transistor 96.

The transistor 96 is connected in an autodyne transistor converter circuit. This type of circuit is shown because it is simple and effective. However it should be understood that the particular circuit is illustrative only and that any suitable converter circuit could be utilized. For example in some instances a separate transistor oscillator may be utilized with a miser diode. The selection of the particular converter circuit utilized will be made in accordance with standard practice after due consideration of the frequencies involved and the type of transistor which it is desired to use.

Whenever an installation of a distribution system according to the present invention is to be made, it will be necessary to decide which television channel of the standard commercially available VHF television receivers will be utilized for the closed circuit television programs. Obviously where the television receiver is to be utilized also for standard commercial broadcasts it will be necessary to select a VHF channel other than those which are utilized by standard broadcast stations in the vicinity. It will also be generally desirable to select a low channel number and consequently a low frequency channel in order to avoid difficulties occasioned by the relatively low cut-off frequencies of the presently available transistors. For the purpose of illustration it will be assumed that channel 2 of a standard commercial television receiver will be utilized for the reception of the closed circuit television programs. Accordingly a frequency converter will be utilized which will convert the 10 megacycle carrier frequency supplied from the central station to the carrier frequency of channel 2.

The operation of the converter circuit which enables the viewer to view the television program being distributed is controlled by a bias signal supplied through a lead 98 to the base of the transistor 96. A negative potential applied to lead 98 produces a current through a resistor 100 which is connected between lead 98 and ground. A voltage drop is thereby produced across resistor 100 which provides a negative bias on the base of transistor 96 with respect to its emitter. The emitter of transistor 96 is therefore positive with respect to the base, and the transistor 96 and its associated circuitry is rendered inoperative as a frequency converter.

Transistor 96 is shown as a NPN transistor for the purpose of illustration. However it is obvious that a PNP transistor could be utilized in place of the NPN transistor in which case all the voltages applied to the transistor would be reversed in polarity for proper operation.

A capacitor 102 is connected in parallel with resistor 100 to bypass the alternating components of the signal supplied to resistor 100. The emitter of the transistor 96 is connected to ground through an emitter resistor 104. The emitter is also connected to a resonant circuit 106 comprising an inductance 108 and a tunable capacitance 110 so that the frequency of the resonant circuit 106 may be adjusted. The connection of the emitter to the resonant circuit 106 is made through a coupling capacitor 112.

Adjustment of the output of the frequency converter comprising the transistor 96 and its associated circuitry may be adjusted by tuning of the capacitor 110 in a well known manner. The collector of the transistor 96 is connected through a winding 114 to the primary 118 of an output transformer 116. The secondary 120 of the transformer 116 is coupled to the antenna terminals or input terminals of the television receiver 121 upon which the closed circuit television program is to be viewed. The winding 114 is inductively coupled to the inductance 108 comprising a part of the resonant circuit 106. Lead 148 supplies a positive potential to the collector of transistor 96 through a resistor 128, transformer primary 118 and winding 114. Primary 118 is provided with an alternating current connection to ground through a capacitor 122. The operation of the autodyne transistor frequency converter circuit comprising the transistor 96 and its associated circuitry is entirely conventional and as previously suggested other frequency converter circuits might be substituted to perform the function of this circuit if desired. Obviously it is desirable to utilize transistor circuits in order to keep the power requirements for the subscriber's station equipment to a minimum.

From a portion of the circuit already explained it will be understood that the subscriber's station is supplied with one or more television program signals transmitted at a carrier frequency different from that which the subscriber's television receiver is adapted to receive. So long as there is no negative bias signal on the bias signal lead 98 the autodyne transistor converter consisting of the transistor 96 and its associated circuitry is effective to convert the television signal to a frequency which the subscriber's television receiver is adapted to receive thus enabling the subscriber to view the television program being transmitted. When a negative bias signal is applied on lead 98 the transistor converter is disabled thus preventing the subscriber from viewing the television program being transmitted.

Although a single subscriber's station has been illustrated for simplicity it will be understood that numerous subscriber's stations will be connected in parallel to the transmission lines 70 and 72 for the reception of television signals. Furthermore repeaters or amplifiers will ordinarily be utilized to amplify the television signals transmitted through the transmission lines 70 and 72. Substations may also be utilized to provide a number of branch lines leading out in various directions from a trunk transmission line. In short, various well known techniques for distributing the television signal with the greatest efficiency may be utilized in conjunction with the invention.

In the distribution of television programs whether by closed circuit or otherwise it is desirable to determine how many television sets are receiving a particular program being broadcast. Program sponsors and others expend a great deal of effort to make surveys and otherwise determine the size of the viewing audience of a given program.

As an optional feature of the present invention means may readily be provided for instantaneously and continuously determining the number of subscribers with their receiver set to receive a given one of several channels or programs. In addition to having the channel selector knob turned to a particular channel it is also necessary that the frequency converter be operating in order for the subscriber to view a particular program. Accordingly means are provided for indicating when the subscriber has his channel selector knob turned to a particular channel and the frequency converter is operative.

A resistor 124 is connected between the more negative terminal of resistor 128, and the junction of lead 98 and resistor 100. The base of transistor 126 is connected effectively at the junction of resistors 124 and 128. When transistor 96 is cut-off so that the frequency converter is inoperative and the subscriber cannot view the program being distributed, there is relatively low current drawn through resistor 128 and the potential at the base of transistor 126 is relatively high. Accordingly transistor 126 is cut-off and passes no current through its emitter collector circuit. When transistor 96 and the frequency converter are operative, current is drawn through resistor 128 producing a voltage drop across this resistor. At this time the potential at the base of transistor 126 is lowered and sufficient forward bias is produced to cause transistor 126 to draw current. A relay 134 having a winding 130 is connected with its winding coupled between the collector of transistor 126 and ground so that when transistor 126 draws current relay 134 is operated thereby operating its armature 136 to connect contact 138 to ground.

Contact 138 is connected through resistor 140 and resistor 142 to a switch contact 144 of channel selector switch 74 which causes the contacts of relay 134 to be effectively connected across the conductors of either transmission line 70 or transmission line 72 according to the position of channel selector switch 74.

The direct current resistance between the conductors of transmission lines 70 and 72 can be maintained very high by the use of isolating capacitors where necessary. Accordingly the resistance of resistors 142 and 140 may be selected to be moderately high such as 150 thousand ohms for example and yet this resistance will be low compared with the open circuit resistance between the conductors of one of the transmission lines 70 or 72.

From the foregoing explanation it will be seen that whenever a subscriber is receiving a particular channel a predetermined resistance (consisting of the series resistance of resistors 142 and 140) will be placed in shunt across the conductors of the transmission line carrying this particular television program. Accordingly the direct current resistance between the conductors of one of the transmission lines 70 and 72 will be an indirect measure of the number of subscribers receiving this channel. Meters 147 may be connected across the conductors of the transmission lines 70 and 72 respectively to read the direct current resistance across these conductors and thus determine the number of subscribers receiving this channel. Meters 147 may simply be ohmeters and may be calibrated to read the number of subscribers directly if desired. Obviously the meters 147 may also be of the recording type so that a continuous record is made of the number of subscribers receiving a particular program and thereby eliminating the necessity for personnel taking periodic readings.

As a further optional feature means may be included to allow the subscriber to respond to questions asked through the medium of the distribution system. This may be accomplished by placing a push button 146 in parallel with resistor 140 so that the resistor 140 may temporarily be short circuited by the push button 146. In operation the subscribers would be asked a question through the medium of the distribution system and would be requested to respond in the affirmative by pressing their respective buttons 146. The pressing of buttons 146 would cause a temporary reduction in the shunt resistance across the conductors of the particular transmission line 70 or 72 which was being utilized. The amount of this temporary reduction of shunt resistance is an indirect measure of the number of subscribers pushing the button 146. The number of subscribers responding to a question may thus be determined by observation of the meters 147 or alternatively, separate meters may be utilized to determine the change in resistance and thus the response to a particular question.

The portion of the system involved with the collection and detection of coins and the control of the frequency converter in response thereto will now be explained.

The collection of coins is controlled by electromagnet 38. The coins will be collected whenever the current to electromagnet 38 is interrupted for any substantial length of time. It is desirable that the coins be subject to collection not only at the control of the central station but also that the coins be collected whenever the subscriber switches from one channel to another. Otherwise the subscriber could switch from channel to channel so long as he had deposited a sufficient number of coins to cover the cost of any channel to which he switched. This is normally undesirable from the point of view of the operators of the system, and accordingly it is desired that the coins be collected whenever the subscriber switches from one channel to another.

Accordingly the lead 148 supplying current to electromagnet 38 passes through a movable switch contact arm 150 which is adapted to engage one of three contacts 152, 154 or 156. Contacts 152 and 156 are associated respectively with channels 1 and 2 and the contact arm 150 is a part of the channel selector switch 74 and is mechanically coupled to engage terminal 152 or terminal 156 when the channel selector is turned to channels 1 or 2 respectively. The center contact 154 is grounded so that in turning from one channel to another current to the electro-magnet 38 is interrupted causing the coins to be collected. Current is supplied to contacts 152 and 156 by means of lead 158 which is connected to a rectifier 160. A filter network consisting of a resistance 168 and a capacitor 170 connected in parallel to ground is provided for the rectifier 160. The rectifier 160 may be a semi-conductor diode such as a diode 1N91. However, any suitable rectifying device may be utilized. Rectifier 160 is connected through a resistor 162 to the output of a filter 164. The filter 164 is a high pass filter designed to pass frequencies of 5 kilocycles and above for example. The input of the filter 164 is derived from a contact arm 166 of the channel selector switch 74. The input contacts for the contact arm 166 are connected respectively to leads 64 and 66 carrying the audio frequency control signal for channels 1 and 2 respectively from the central station.

As previously explained control signals are provided through leads 64 and 66 which furnish power for the operation of the subscriber's station equipment and also by their frequency control a number of coins which must be deposited in order to render the frequency converter circuit operative so that the subscriber may view a program. Any suitable audio frequency generating means may be utilized to generate the control signals as indicated schematically at 63.

The filter 164 allows the audio frequency control signals to pass through the rectifier 160 where they are rectified to supply D.C. power to operate the subscriber station equipment. As previously explained the audio frequency control signal is interrupted to collect the coins at the subscriber's stations which are tuned to a particular channel. On the other hand the filter 164 prevents a subscriber from physically connecting or otherwise coupling his 60 cycle per second household power supply to the control signal leads to supply power to his frequency converter and thereby circumvent the operation of the distribution system. The likelihood of a subscriber generating an audio frequency signal of sufficient power to operate his equipment and coupling it into the subscriber station equipment is very remote.

As a further optional feature of the present invention a sound distribution system may be incorporated as a part of the audio control signal distribution system. The sound distribution system could be utilized in various ways; for example, it could be utilized to advertise the programs which were being distributed over the television distribution system. It could also be utilized to transmit music or other audio entertainment to the subscriber without charge or it could be used as a disaster warning signal. As a disaster warning signal it has the advantage that it is independent of normal household power supply.

As previously explained, the sound system utilizes the same physical circuit for distribution of sound signals as is used for the audio control signals. The input for the sound distribution system is derived from the contact arm 166 of the channel selector switch 74. The contact arm 166 is connected to a filter 172. The filter 172 is a low pass filter which passes frequencies below 5 kilocycles. The frequency range up to 5 kilocycles provides adequate response for the sound distribution system. However it is obvious that the point of demarcation between the sound distribution system and the audio control signal system could be placed at some other frequency rather than 5 kilocycles if desired.

The output from the low pass filter 172 is supplied directly to an auxiliary loud speaker jack 178 and through a variable resistance volume control 176 to a speaker 174.

Utilizing the system as shown and described it is possible to transmit a sound signal for distribution to subscriber stations over the same physical circuit utilized for the audio controlled signals, and the filters 164 and 172 insure that the audio control signals do not interfere with the operation of the sound distribution system and vice versa.

The manner in which the number of coins deposited by the subscriber is detected and the manner in which the frequency converter is rendered operative in response to the deposit of a certain number of coins will now be explained.

Referring to FIG. 5, the audio control signal from the central station 62 is fed through filter 164 and into the primary 182 of an input transformer 180 for the coin detection section of the subscriber station equipment. A series of taps are provided on secondary 184 of transformer 180 each of which leads to a respective one of a series of condensers 186a through 186g. Associated with each one of the capacitors 186a through 186g is one of a series of coils 188a through 188f and 194. Each of the capacitors with its associated coil forms a series resonant circuit which is connected to ground through one of a series of lamps 34a through 34f and 30.

To simplify the explanation of the circuit one section thereof consisting of capacitor 186f, coil 188f and lamp 34f will first be considered by itself.

The series resonant circuit comprising the capacitor 186f and the coil 188f is resonant at a frequency of 16 kilocycles. The lamp 34f in series with the capacitor 186f and the coil 188f is the lamp marked 25¢ as shown in FIG. 1 and accordingly the frequency associated with a payment of 25¢ is 16 kilocycles. Thus when the central station determines that a charge of 25¢ is to be made for a particular program on a given channel an audio control signal of 16 kilocycles will be transmitted on the audio control lead for that channel.

Any subscriber having his channel selector switch 74 turned to that channel will therefore cause a 16 kilocycle signal to be fed through the transformer 180 and into all of the resonant circuits supplied by the secondary 184 at the transformer 180, among them the resonant circuit comprising the capacitor **186*f* and the coil 188*f*. Since the resonant circuit comprising the capacitor 186*f* and the coil 188*f* is resonant at 16 kilocycles it will have a low impedance at this frequency and the current which it passes will be sufficient to light the lamp 34*f***.

On the other hand none of the other resonant circuits will be resonant at the frequency of 16 kilocycles, and they will therefore each have a high impedance which will limit the flow of current to a value which is inadequate to light any of the remaining lamps. It will thus be seen that the transmission of a 16 kilocycle control signal from the central station serves to light the 25¢ lamp on any of the subscriber's station control boxes where the channel selector switch is turned to the particular channel involved.

Connected between the junction of each lamp 34 and its associated coil 188 there is a respective one of a set of resistors **196*a* through 196*f*. These resistors have a common connection through a diode 198 or other suitable rectifying device to the bias signal lead 98. A filtering capacitor 20 is connected between the bias signal lead 98 and ground to filter out unwanted alternating current components from the output of the diode 198**.

Again considering the circuit including capacitor **186*f* and coil 188*f* it will be observed that when the lamp 34*f* is lighted due to the transmission of a 16 kilocycle audio control signal an alternating voltage drop will exist across the lamp 34*f* and this voltage drop is supplied through resistor 196*f* to the diode 198 where it is rectified and transmitted to the bias signal lead 98**.

The bias signal lead 98 is therefore provided with a negative bias signal when the lamp **34*f* is lit. Since each of the other resistors 196*a* to 196*e* are similarly connected it may be observed that whenever a lamp is lit indicating a payment of coins to be made, there is a negative bias signal supplied to bias lead 98** which as has been previously explained causes the frequency converter to be disabled and thereby prevents the subscriber from viewing the program being transmitted.

Although the particular embodiments of the invention illustrated show the variation of the frequency of the control signal to determine the charge for the program, another parameter or characteristic of the control signal might be utilized still retaining many features of the invention.

Before explaining how the deposit of coins is effective to allow the frequency converter to operate and thus allow the subscriber to view the program it should first be noted that the resonant circuit comprising the capacitor **186*g* and the coil 194 is connected differently from the connection provided for the other resonant circuits. The lamp connected in series with the resonant circuit comprising capacitor 186*g* and coil 194 is the "free" lamp 30** which is shown at the top of the control box in FIGS. 1 and 2.

This lamp indicates to the subscriber that a program is being transmitted or will be transmitted for which there is no payment of money required. When the lamp 30 is lit the frequency converter is not disabled and the subscriber's television receiver is operative to view the program being transmitted. This is due to the fact that there is no resistor coupling the junction of lamp 30 and coil 194 to the input of the diode 198 supplying the bias signal for disabling the frequency converter.

This feature whereby it is possible to transmit free programs on the same channels for which payment is normally required is a particularly advantageous feature of the invention; in addition to being used for transmitting free entertainment it may also be utilized for transmitting advertising relating to forthcoming paid programs. In addition it may be desirable to promote interest in a program for which payment is required by allowing the subscriber to view the first portion of the program without payment of money and thereafter changing the frequency of the audio control signal to require a payment of money to view the remainder of the program.

Figure 4:
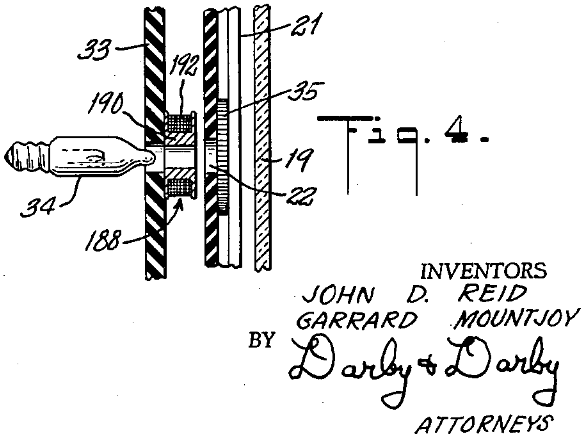
FIG. 4 is a sectional view of electromagnetic coin detection mechanism utilized in the apparatus of FIGS. 1 and 2.

The manner in which the deposit of coins is effective to render the frequency converter circuit of the subscriber station equipment operative and thereby to allow a program to be viewed will be understood by reference to FIGS. 2, 4 and 5.

The physical nature of the coils 188 will be explained with reference to FIG. 4 which shows the construction of one of the coils and its position within the coin box by way of example. Since all of the coils are similar FIG. 4 is representative of the construction of any of the coils 188.

In FIG. 4 the coil 188 is placed directly behind the position of a coin 35 behind the coin chute 21. The coil 188 comprises a winding 192 wound on a hollow core 190 of magnetic material. The core 190 may for example be a hollow ferrite core although it could also be formed of soft iron or some other material. Located behind the coil 188 is a lamp 34 which may be of the type having a self-contained lens so that it directs a beam of light through the hole in the core 190 of the coil 188 and through the hole 22 and the window 19 (when there is no coin 35 obstructing this path).

The coin chute 21 and the lamp frame 33 are preferably formed of non-magnetic material. For example the lamp frame 33 and the coin chute 21 may be formed of a plastic such as a "Bakelite" or "Tenite." The inductance of the coil 188 will be substantially different when a coin 35 is placed in proximity thereto as compared with its inductance in the absence of such a coin. The coin 35 being of conductive material will be susceptible to the generation of eddy currents which will tend to counteract the magnetic field generated by the coil 188 and thereby will greatly reduce the inductance of the coil 188. It is generally desirable that the coin chute 21 be placed so that the coin 35 will be in as close proximity to the coil 188 as possible. However it is possible for the coin to be placed ⅛ of an inch or farther from the coil 188 and still be effective.

Referring again to the resonant circuit comprising capacitor **186*f* and coil 188*f*, when a coin is placed in proximity to the coil 188*f* the inductance of the coil 188*f* will change substantially. This will cause a corresponding change in the resonant frequency of the circuit so that it is no longer resonant at 16 kilocycles but is resonant at a substantially higher frequency. The impedance of the resonant circuit comprising capacitor 186*f* and 188*f*** for a signal of 16 kilocycles will therefore be greatly increased and the current through this circuit will be diminished by a factor as great as 10 or more.

The reduced current will be insufficient to light the lamp **34*f* and will also be insufficient to provide any substantial negative bias potential to the bias lead 98 and thus the frequency converter consisting of the transistor 96** and its associated circuitry will be rendered operative.

It has been seen therefore that upon transmission of a 16 kilocycle audio control signal from the central station on channel 1 for example, the subscribers who have their channel selectors set to this channel will observe that the light marked 25¢ on their control box is lit. If they attempt to receive the program on their television receiver they will find that it is inoperative to receive the program. However if they deposit a quarter of a dollar in the coin box 11 it will be held and prevented from dropping into the coin receptacle 16 by the coin gate 36 as previously explained. Thus the quarter will rest in a position in proximity to coil **188*f* and the resonant circuit associated with this coil will be detuned so that a high impedance is created in the circuit thus extinguishing the lamp 34*f* and removing the bias potential from the bias lead 98.**

In addition the quarter will be visible through the window 19 in the position formerly occupied by the beam from the lamp **34*f*. Although the lamp 34*f*** will be obsecured, this is immaterial since it will have been extinguished in any event.

At this point the frequency converter will have been rendered operative and the subscriber may view the program which is being transmitted to his television receiver from the central station through transmission line 70.

At the conclusion of the program the central station will cause the 16 kilocycle signal transmitted over audio control lead 64 to be discontinued; in the absence of audio frequency power there is no power to operate the frequency converter and it is therefore inoperative. At the same time the lack of power causes the electro-magnet 38 to be deenergized thus dropping the quarter into the coin receptacle 16. The subscriber station equipment is therefore prepared for the transmission of another program, either paid or free.

From the foregoing explanation it will be observed that a system is provided in FIGS. 1 through 5 which allows television signals to be distributed under the control of a central distribution station whereby the number of coins and hence the amount of money required to view a given program at a subscriber's station is determined by a frequency of a control signal transmitted to power a frequency converter apparatus forming a necessary part of the television distribution system.

The system is provided with a means for instantaneously determining the number of subscribers stations receiving a particular program and also for interrogating the subscriber and obtaining a response to questions asked through the medium of the distribution system.

The physical circuits utilized for the audio control signal are also utilized for the distribution of one or more sound signals to the subscriber stations.

In the electrical circuit illustrated in FIG. 5 the number of coins deposited into the coin box is detected electro-magnetically thereby eliminating the necessity for mechanical detection means and providing a trouble free and simple apparatus. It should be appreciated that the electro-magnetic coin detection means of FIG. 5 may be utilized in applications other than the television distribution system as shown. Accordingly the scope of the invention should be construed to include the use of the electro-magnetic coin detection means of FIG. 5 in other coin operated devices including but not limited to vending machines, amusement devices and the like.

Figure 6:
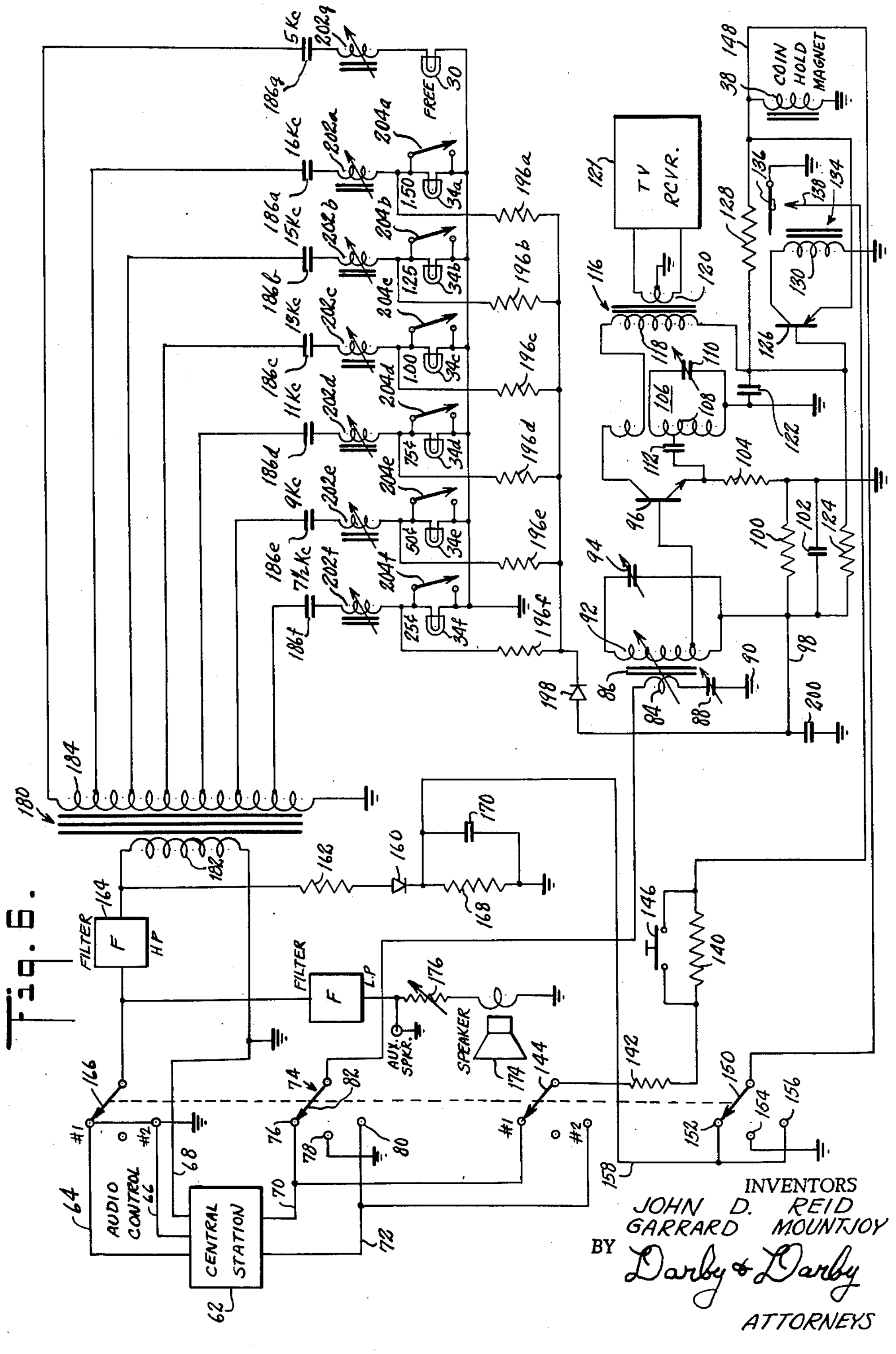
FIG. 6 is a schematic circuit diagram of an alternative distribution and control circuit utilizing a mechanical rather than an electromagetic coin detecting device.

FIG. 6 shows an alternative circuit arrangement according to the present invention wherein a different type of coin detection device is utilized. Since the major portion of the circuit of FIG. 6 is identical to that of FIG. 5 only that portion which differs, namely the coin detection section of the circuit, will be explained.

As in FIG. 5 the audio control signal from the central station 62 is supplied through secondary 184 of transformer 180 to a plurality of coin detection circuits. Each of the circuits includes a series resonant circuit which is resonant at a respectively different frequency.

The capacitors **186*a* through 186*g* in respective ones of the resonant circuits are the same as those shown in FIG. 5. The coils associated with respective ones of these capacitors differ however from those shown in FIG. 5 in that they are conventional coils 202*a* through 202*g* which are not necessarily placed in physical proximity to the coin station to which they are related. The coils 202*a* through 202*g*** may be of the tunable type to facilitate tuning of the various resonant circuits to their respective audio frequency.

The lamps **34*a* through 34*f* and 30 may be identical to those shown in FIG. 5 and may be connected similarly in association with their respective resonant circuits. In FIG. 6 switches 204*a* through 204*f* are added which are placed in parallel respectively with lamps 34*a* through 34*f*** so that when one of the switches is closed it shunts its corresponding lamp and causes it to be extinguished.

The switches **204*a* through 204*f* are operated by the presence of coins and respective ones of the coin locations as illustrated in FIGS. 1 and 2. The switches 204*a* through 204*f* may be sensitive switches located to cause coins to bear against the contacts and thereby close the switches or alternatively the switches 204*a* through 204*f* may constitute simply two spaced contacts adapted to contact respective portions of one of the coins 35** which in itself will complete the electrical circuit since they are made of conductive material. The operation of a coin detection circuit of FIG. 6 is as follows. Assume that it is desired to transmit a television program for which the charge is to be 25¢, the central station will transmit an audio control signal over channel 1 having a frequency of 7½ kilocycles.

This frequency will be transmitted through the transformer 180 to each of the resonant circuits of the coin detection system but it will encounter a high impedance at all resonant circuits except that circuit comprising capacitor **186*f* and coil 202*f* which is tuned to the frequency of 7½ kilocycles and accordingly has a low impedance at this frequency. Lamp 34*f*** will be lit by the 7½ kilocycle audio control signal while all other lamps in the coin box will remain extinguished. This will indicate to the subscriber that a program is being broadcast for which the charge is one quarter of a dollar.

At the same time the 7½ kilocycle signal will create a voltage drop across the lamp **34*f* which will be transmitted by means of resistors 196*f* to rectifier 198** where it will be rectified to supply a bias signal to cut off the frequency converter and prevent the viewing of the television program being transmitted over channel 1. This portion of the operation is identical with that previously described with reference to FIG. 5.

If the subscriber desires to view the program he will deposit 25¢ in the coin box which will cause switch **204*f* to be closed, lamp 34*f* will thereby be short-circuited and extinguished. Simultaneously the voltage drop across the lamp 34*f*** will be virtually eliminated thereby eliminating the bias signal heretofore disabling the frequency converter. The frequency converter will thus become operative to enable the viewer to receive the television program being transmitted.

Obviously if the programs requiring a greater number of coins were transmitted, a higher frequency would be utilized and the subscriber will be required to place a greater number of coins in the coin box so that they would stack up to reach one of the switches **204*a* through 204*e*** to short circuit the appropriate lamp and render the frequency converter circuit operative.

The other operations of the circuit of FIG. 6 are identical to those of FIG. 5 so that coins are collected, the audience for a program is monitored, and other operations are carried on with the apparatus of FIG. 6 in the same fashion as previously explained with reference to FIG. 5.

From the foregoing explanation it will be observed that a television distribution system is provided particularly adapted to the distribution of television programs over a closed circuit and wherein the deposit of selected number of coins in a control box at the subscriber station may be required all under control of the central station. The system renders it very difficult for the subscriber to circumvent the operation of the control system. The system also includes desirable features such as the instantaneous monitoring of the audience for one or more programs being distributed, and facilities for distribution of sound signals to the subscriber stations independent of the picture and sound being distributed as a part of a television program.

In addition to the various modifications shown and suggested in the foregoing description it is obvious that numerous other variations and modifications could be devised within the scope of the present invention. Accordingly the scope of the present invention is not to be construed to be limited to the particular embodiment shown or suggested but is rather to be limited solely by the appended claims.

What is claimed is:

1. A centrally controlled closed-circuit television distribution system for distributing television programs on a program-by-program payment basis comprising means for distributing a television signal by a closed circuit to a plurality of subscriber stations, means for distributing a control signal of a frequency controllable within a predetermined range to said subscriber stations and a coin-operated control box connected to receive said control signal at each subscriber station for controlling the utilization of said television signal, said control box comprising a high-pass filter adapted to accept signals within the predetermined frequency range of said control signals and to reject signals of lower frequency, an inductive coin detection apparatus comprising a plurality of coin stations, means for guiding coins to said coin stations, said previous two means being formed of a non-magnetic material, a plurality of resonant circuits each including a capacitance and a coil having a core in proximity to said coin station, said circuits being connected to receive the output of said filter, a respective electric lamp connected to indicate the resonance condition of said each resonant circuit, an enabling circuit for providing a television signal from said control box which may be utilized by a conventional television receiver, and means for disabling said enabling circuit in response to the reception of a control signal having a frequency corresponding to the normal resonant frequency of one of said resonant circuits, whereby a control signal of a particular frequency may be transmitted to said subscriber stations to indicate the cost of a transmitted program and only those subscribers depositing the indicated number of coins will be able to view the television program being transmitted.

2. A centrally controlled closed-circuit television distribution system for distributing television programs on a program-by-program payment basis comprising means for distributing a television signal by a closed circuit to a plurality of subscriber stations, means for distributing a control signal of controllable frequency within a predetermined range to said subscriber stations, and a coin-operated control box connected to receive said control signal at each subscriber station for controlling the utilization of said television signal, said control box comprising a high-pass filter adapted to accept signals within the predetermined frequency range of said control signals and to reject signals of lower frequency, a plurality of tuned circuits tuned to different frequencies within the predetermined frequency range of said control signals and connected to receive the output of said filter, a plurality of indicator lights respectively responsive to said tuned circuits for indicating the reception of control signals of predetermined frequencies, an enabling circuit for providing a television signal from said control box which may be utilized by a conventional television receiver, means for disabling said enabling circuit in response to the reception of a control signal having a frequency corresponding to the normal resonant frequency of certain of said tuned circuits, said tuned circuits comprising means for changing the resonant frequency thereof in response to deposit of coins in said control box, whereby a control signal of a particular frequency may be transmitted to said subscriber stations to indicate the cost of a transmitted program and only those subscribers depositing the indicated number of coins will be able to view the television program being transmitted.

3. A centrally controlled close-circuit television distribution system for distributing television programs on a program-by-program payment basis comprising means for distributing a television signal by a closed circuit to a plurality of subscriber stations, means for distributing a control signal of a frequency controllable within a predetermined range to said subscriber stations, and a coin-operated control box connected to receive said control signal at each subscriber station for controlling the utilization of said television signal, said control box comprising a high-pass filter adapted to accept signals within the predetermined frequency range of said control signals and to reject signals of lower frequency, a plurality of tuned circuits tuned to different frequencies within the predetermined frequency range of said control signals and connected to receive the output of said filter, a plurality of indicator lights respectively responsive to said tuned circuits for indicating the reception of control signals of predetermined frequencies, an enabling circuit for providing a television signal from said control box which may be utilized by a conventional television receiver, means for disabling said enabling circuit in response to the reception of a control signal having a frequency corresponding to the normal resonant frequency of certain of said tuned circuits, respective means for rendering said tuned circuits ineffective to operate said disabling means in response to deposit of coins in said control box, whereby a control signal of a particular frequency may be transmitted to said subscriber stations to indicate the cost of a transmitted program and only those subscribers depositing the indicated number of coins will be able to view the television program being transmitted.

4. A centrally controlled closed-circuit television distribution system for distributing television programs on a program-by-program payment basis comprising means for distributing a television signal by a closed circuit to a plurality of subscriber stations, means for distributing a control signal of frequency controllable within a predetermined range to said subscriber stations, and a coin-operated control box connected to receive said control signal at each subscriber station for controlling the utilization of said television signal, said control box comprising a plurality of tuned circuits tuned to different frequencies within the predetermined frequency range of said control signals and connected to receive said signals, an enabling circuit for providing a television signal from said control box which may be utilized by a conventional television receiver, means for disabling said enabling circuit in response to the reception of a control signal having a frequency corresponding to the normal resonant frequency of certain of said tuned circuits, and means for rendering said tuned circuit ineffective to operate said disabling means in response to deposit of coins in said control box, whereby a control signal of a particular frequency may be transmitted to said subscriber stations to indicate the cost of a transmitted program and only those subscribers depositing the indicated number of coins will be able to view the television program being transmitted.

5. A controlled closed-circuit television distribution system for distributing television programs on a program-by-program payment basis comprising means for distributing a television signal by a closed circuit to a plurality of subscriber stations, a coin-operated control box at each subscriber station for controlling the utilization of said signal, said control box being independent of local power, means for supplying electrical current of variable frequency from a central station to power said control boxes, and means responsive to the frequency of said current to condition each said coin-operated control box to require the insertion of a desired number of coins as a condition for viewing a program at said station.

6. A centrally controlled closed-circuit television distribution system for distributing television programs on a program-by-program payment basis comprising means for distributing a television signal by a closed circuit to a plurality of subscriber stations, means for distributing a control signal of a controllable frequency within a predetermined range to said subscriber stations, and a coin-operated control box powered by said control signal at each subscriber station for controlling the utilization of said television signal, said control box comprising a high-pass filter adapted to accept signals within the predetermined frequency range of said control signals and to reject signals of lower frequency, an inductive coin detection apparatus comprising a plurality of coin stations, means for guiding coins to said coin stations, a plurality of resonant circuits each including a capacitance and a coil having a core in proximity to said coin station, said circuits being connected to receive the output of said filter, a respective electric lamp connected to indicate the resonance condition of said each resonant circuit, an enabling circuit for providing a television signal from said control box which may be utilized by a conventional television receiver, and means for disabling said enabling circuit in response to the reception of a control signal having a frequency corresponding to the normal resonant frequency of one of said resonant circuits, whereby a control signal of a particular frequency may be transmitted to said subscriber stations to indicate the cost of a transmitted program and only those subscribers depositing the indicated number of coins will be able to view the television program being transmitted.

7. An inductive coin detector comprising a coin station, means for guiding a coin to said coin station, a resonant electrical circuit, said circuit comprising a coil having a core in proximity to said coin station, said circuit being resonant at a predetermined frequency in the absence of a coin at said coin station, the resonant frequency of said circuit being modified by the presence of a coin at said coin station so that it is not resonant at said predetermined frequency, and means for utilizing the change in electrical current in said resonant electrical circuit to provide a control signal responsive to the presence of a coin at said coin station.

8. An inductive coin detector comprising a coin station, means for guiding a coin to said coin station, a resonant electrical circuit, said circuit comprising a coil having a core in proximity to said coin station, said circuit being resonant at a predetermined frequency in the absence of a coin at said coin station, the resonant frequency of said circuit being modified by the presence of a coin at said coin station so that it is not resonant at said predetermined frequency, means for utilizing the change in electrical current in said resonant electrical circuit to provide a control signal responsive to the presence of a coin at said station and an indicator energized from said resonant electrical circuit when said resonant electrical circuit is supplied with an electrical signal having a frequency substantially equal to its resonant frequency.

9. A coin operated control box for control of the distribution of a television signal comprising means for accepting a television signal not directly usable in a standard television receiver, output means controllable to provide an output signal directly usable in a standard television receiver, cut-off means for controlling said output means in response to an electrical signal, to prevent the operation thereof control signal acceptance means for accepting a control signal within a predetermined range of frequencies, a plurality of means for transmission of respectively different frequencies within said range of frequencies from the said control signal acceptance means to said cut-off means, means for disabling respective ones of said plurality of means in response to deposit of respective numbers of coins in said control box, and means for supplying operating power for the operation of certain of the previously described means from said control signal acceptance means.

10. A coin operated control box for control of the distribution of a television signal comprising means for accepting a television signal not directly usable in a standard television receiver, output means controllable to provide an output signal directly usable in a standard television receiver, cut-off means for controlling said output means in response to an electrical signal, to prevent the operation thereof, control signal acceptance means for accepting a control signal within a predetermined range of frequencies, a plurality of means for transmission of respectively different frequencies within said range of frequencies from the said control signal acceptance means to said cut-off means, means for disabling respective ones of said plurality of means in response to deposit of respective numbers of coins in said control box, a subscriber monitoring circuit and means responsive to the operative condition of said output means for altering the electrical characteristics of said monitoring circuit, and means for supplying operating power for the operation of certain of the previously described means from said control signal acceptance means.

11. A coin operated control box for control of the distribution of a television signal comprising means for accepting a television signal not directly usable in a standard television receiver, output means controllable to provide an output signal directly usable in a standard television receiver, cut-off means for controlling said output means in response to an electrical signal, to prevent the operation thereof, control signal acceptance means for accepting a control signal within a predetermined range of frequencies, a plurality of means for transmission of respectively different frequencies within said range of frequencies from the said control signal acceptance means to said cut-off means, means for disabling respective ones of said plurality of means in response to deposit of respective numbers of coins in said control box, channel selector means for selecting one of a plurality of signals to be supplied to the first said means, a subscriber monitoring circuit and means responsive to the operative condition of said output means and to said channel selector means for altering the electrical characteristics of said monitoring circuit, and means for supplying operating power for the operation of certain of the previously described means from said control signal acceptance means.

12. A coin operated control box for control of the distribution of a television signal comprising means for accepting a television signal not directly usable in a standard television receiver, output means controllable to provide an output signal directly usable in a standard television receiver, cut-off means for controlling said output means to prevent the operation thereof in response to an electrical signal, control signal acceptance means for accepting a control signal within a predetermined range of said cut-off means, means for disabling respective ones of said plurality of means in response to deposit of respective numbers of coins in said control box, means for causing deposit of deposited coins into a coin collection receptacle in response to a predetermined condition of said control signal, and means for supplying operating power for the operation of certain of the previously described means from said control signal acceptance means.

13. A controlled closed-circuit television distribution system for distributing television programs on a program-by-program payment basis comprising means for distributing a television signal by closed-circuit transmission line means from a central station to a plurality of subscriber stations, a coin-operated control box at each subscriber station for controlling the utilization of said signal, means for supplying electrical current of variable frequency from said central station to power said control boxes, means responsive to the frequency of said current to condition each said coin-operated control box to require the insertion of a desired number of coins as a condition for viewing a program at said subscriber station, and audience survey means for determining the number of said subscriber stations viewing a particular program, said survey means comprising a subscriber monitoring circuit linking said central station and said subscriber stations and including said transmission line means, and means responsive to the operation of said coin-operated control box in controlling the utilization of said signal for varying the impedance of said monitoring circuit by a predetermined amount.

References Cited in the file of this patent

UNITED STATES PATENTS

| | | |
|---|---|---|
| 2,361,835 | Fry | Oct. 31, 1944 |
| 2,504,731 | Rose | Apr. 18, 1950 |
| 2,540,063 | Victoreen | Jan. 30, 1951 |
| 2,769,023 | Loew | Oct. 30, 1956 |
| 2,843,654 | Gottfried | July 15, 1958 |

---

UNITED STATES PATENT OFFICE

CERTIFICATE OF CORRECTION

Patent No. 3,021,383 February 13, 1962

Garrard Mountjoy et al.

It is hereby certified that error appears in the above numbered patent requiring correction and that the said Letters Patent should read as corrected below.

Column 18, line 53, after "range of" insert -- frequencies, a plurality of means for transmitting respectively different frequencies within said range of frequencies from the said control signal acceptance means to --.

Signed and sealed this 24th day of July 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,021,383 February 13, 1962

Garrard Mountjoy et al.

It is hereby certified that error appears in the above numbered patent requiring correction and that the said Letters Patent should read as corrected below.

Column 18, line 53, after "range of" insert -- frequencies, a plurality of means for transmitting respectively different frequencies within said range of frequencies from the said control signal acceptance means to --.

Signed and sealed this 24th day of July 1962.

(SEAL)
Attest:

ERNEST W. SWIDER
Attesting Officer

DAVID L. LADD
Commissioner of Patents